United States Patent [19]
Friberg

[11] Patent Number: 4,499,926
[45] Date of Patent: Feb. 19, 1985

[54] CABLE JACKET

[75] Inventor: Gunnar S. Friberg, Kungälv, Sweden

[73] Assignee: AB Volvo, Goetborg, Sweden

[21] Appl. No.: 549,729

[22] Filed: Nov. 8, 1983

[51] Int. Cl.3 .............................................. F16L 11/08
[52] U.S. Cl. .................................... 138/126; 138/123; 174/47
[58] Field of Search ............... 138/124, 125, 126, 129, 138/132, 133, 174, 137, 123; 174/68 R, 68 C, 98, 99 R, 47, 15 R, 15 WF

[56] References Cited

U.S. PATENT DOCUMENTS

| | | | |
|---|---|---|---|
| 945,686 | 1/1910 | Bonner | 138/132 X |
| 1,011,090 | 12/1911 | Subers | 138/132 X |
| 1,357,701 | 11/1920 | Goodall | 138/132 |
| 1,849,717 | 3/1932 | Kennedy | 138/132 X |
| 2,151,307 | 3/1939 | Smith | 138/133 |
| 2,308,673 | 1/1943 | Burgett . | |
| 2,767,741 | 10/1956 | Knowland et al. | 138/132 |
| 3,446,247 | 5/1969 | Manning | 138/126 X |
| 3,500,867 | 3/1970 | Elson | 138/132 X |

FOREIGN PATENT DOCUMENTS

| | | | |
|---|---|---|---|
| 157203 | 3/1953 | Australia | 138/126 |
| 1465108 | 1/1969 | Fed. Rep. of Germany . | |
| 2553719 | 11/1977 | Fed. Rep. of Germany . | |
| 3,008,808 | 9/1981 | Fed. Rep. of Germany . | |

OTHER PUBLICATIONS

Swedish Magazine "Plastforum", No. 5, 1975, pp. 42–43.

*Primary Examiner*—James E. Bryant, III
*Attorney, Agent, or Firm*—Young & Thompson

[57] ABSTRACT

To provide a jacket for electrical welding cables with good torsional and bending flexibility as well as form strength at high internal pressures, a surrounding reinforcement layer of conventional warp-knit type is vulcanized into the rubber jacket. In the radial direction outside this reinforcement layer, at least one unidirectionally helically wound reinforcing card is vulcanized into the rubber jacket, the spacing between adjacent cord windings measuring in the longitudinal direction of the jacket about 2–8 mm, preferably about 4 mm.

3 Claims, 2 Drawing Figures

CABLE JACKET

The present invention relates to a cable jacket, especially a rubber jacket, to an electric welding cable and is designed to enclose groups of electrical conductors and coolant ducts for conducting pressurized medium for cooling the cable.

In modern automatic welding machines such as robot-type welders in which the length of the welding cable is often very short, the welding cable must be quite flexible both transversely to the longitudinal direction of the cable and about the central axis, i.e. it must be both easily bendable and twistable. Furthermore, such cables must be able to absorb the pressure stresses which are applied to the cable jacket from the inside by the pressurized coolant, and by the repelling radial forces generated by the cable cores every time the current through the cable is turned on or off.

The previously known welding cable jackets have not been able to fulfill all of these requirements. Rather, the short cable length in question have been so rigid that they have hampered the movement of the welding robot and have resulted in fatigue failures at the bending points of the cable.

The primary purpose of the present invention is therefore to achieve a cable jacket which, even with very short lengths, is sufficiently flexible with regard to both bending and torsion, and is capable of absorbing the circumferential tensile forces in the jacket arising due to the pressure exerted by the coolant in the cable and the repelling radial forces generated by the cable cores every time the current through the cable is turned on or off. To achieve this, the cable jacket described by way of introduction is characterized, according to the invention, in that at least one surrounding reinforcement layer of warp-knit type known per se is vulcanized into the rubber jacket, and that radially outside said layer there are vulcanized one or more unidirectionally, helically wound reinforcing cords, the spacing between the adjacent cord windings measuring in the longitudinal direction of the jacket about 2–8 mm, preferably about 4 mm. To prevent the jacket with the warp-knit reinforcement from expanding too much due to inner pressure and in order to provide good torsional properties at the same time, it is thus necessary that the reinforcing cord(s) be helically wound in the same direction and preferably lie on common cylindrical contour radially outside the warp-init layer in the jacket. Suitably, each reinforcing cord consists of a slightly twined polyester string. It is also suitable that the layers of warp-knit reinforcement and reinforcing cords be separated radially by an intermediate rubber layer.

The invention will be described below in more detail with reference to the accompanying drawing.

Figure 1:
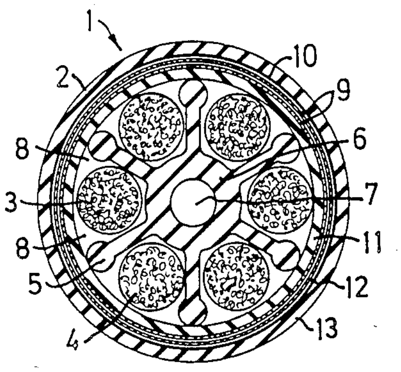
Figure 2:
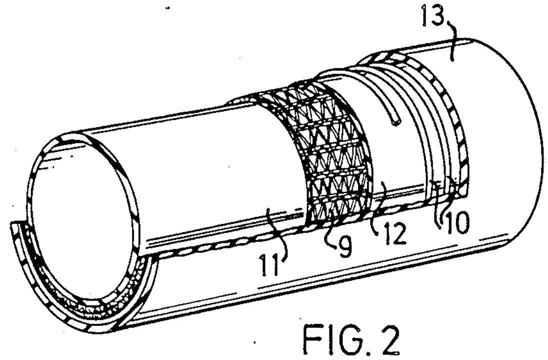

FIG. 1 is a cross-sectional view of a welding cable with a jacket according to the present invention, and FIG. 2 is a cut-away perspective view showing the various layers in a cable jacket according to the invention.

FIG. 1 shows according to scale a cross section of a welding cable 1, which has an outer cable jacket 2 of rubber in accordance with the present invention. The jacket 2 encloses a group of electrical conductors in the form of copper cores 3 and 4 of different polarity, the cores being placed in a ring and separated circumferentially by rib-like walls 5 which project radially out from a central body 6 of rubber or PVC. The central body 6 has a central coolant duct 7 and defines, between its outside and the inside of the outer jacket 2, additional flow ducts 8 for a pressurized coolant, e.g. water.

As indicated in FIG. 1, the jacket 2 comprises two reinforcement layers 9 of a warp-knit fabric which is known per se and a cord helix 10 lying outside said two layers. Warp-knit fabric refers in this context to a textile construction in which yarns, usually filament yarns, are interlooped by knitting, with the yarn threads running essentially in the longitudinal direction of the fabric.

FIG. 2 shows more clearly the structure of a jacket according to the invention, which only shows one layer of warp-knit reinforcement layer 9. Starting from the inside, the jacket 2 has a rubber layer 11, a warp-knit reinforcement layer 9, a thin layer 12 of rubber, a helically wound layer 10 e.g. of lightly twined polyester, and an outer layer 13 of rubber. In order to obtain the desired flexibility both for bending and torsion, as well as form strength, since the jacket is subjected to high inner pressure by the coolant and radial repellant forces generated by the cable cores whenever the current through the cable is turned on or off, it is essential, that if a plurality of cords 10 are used that they run parallel to each other and be wound in the same direction, i.e., and thus be disposed on a common cylindrical contour not crossing each other. The cords should be wound leaving a gap of about 2–8 mm, preferably about 4 mm, between adjacent cord windings.

A cable jacket according to the invention is made preferably in finite lengths by being built up on a mandrel, with one or two layers of warp-knit fabric being applied around the inner rubber layer 11. If there is more than one layer, a thin layer of rubber should be placed between the layers, and a thin layer 12 outside the outer warp knit layer 9. Preferably a single cord 10 of previously described type is then wound around the layer 12 helically with a pitch so that the distance between the adjacent windings of the cord will be about 2–8 mm, preferably about 4 mm, at a normal diameter of about 5–6 cm. Although a single cord is preferable, two or even more cords can be wound parallel in the same winding direction, on a common cylindrical contour, maintaining said distance between the cord windings, but this sacrifices some of the good torsional properties of the jacket. An outer layer 13 of rubber is then applied outside the cord layer, and the components of the jacket are then vulcanized together into an integrated unit. The outside of the jacket is then given such a structure that its friction against a surface is reduced to the required level.

What I claim is:

1. Cable jacket, in particular a rubber jacket for a welding cable and adapted to enclose groups of electrical conductors and coolant ducts for conducting pressurized medium for cooling the cable, comprising a first inner rubber layer, at least one reinforcement layer of warp-knit type radially outwardly of said first layer, a second intermediate rubber layer located radially outwardly of said reinforcement layer, at least one cord helically wound radially outward said reinforcement layer, said cord consisting of a twined string, the spacing between adjacent cord windings measuring in the longitudinal direction of the jacket about 2–8 mm, and an outer rubber layer radially outwardly of said cord, the reinforcement warp-knit layer and the cord being vulcanized into their respective adjacent rubber layers such that in the finished jacket a radial distance is maintained between the warp-knit layer and the cord.

2. Jacket according to claim 1, comprising a plurality of said cords unidirectionally wound on a common cylindrical contour.

3. Jacket according to claim 1, in which said spacing between adjacent cord windings is about 4 mm.

* * * * *